April 11, 1944.  E. G. STRAUS  2,346,624
COATING COMPOSITION, COATED ARTICLE, AND METHOD OF MAKING SAME
Filed Jan. 10, 1942

INVENTOR.
EDWIN G. STRAUS
BY Wm. S. Pritchard
ATTORNEY.

Patented Apr. 11, 1944

2,346,624

UNITED STATES PATENT OFFICE 2,346,624

COATING COMPOSITION, COATED ARTICLE, AND METHOD OF MAKING SAME

Edwin G. Straus, New York, N. Y., assignor to Nalco Inc., New York, N. Y., a corporation of New York Application January 10, 1942, Serial No. 426,366

9 Claims. (Cl. 117—64)

This invention relates to coated materials. More particularly, this invention relates to compositions of matter for producing the metallized material, the metallized materials and the method of making the same.

The nature and objects of this invention will become clear from the following description, appended claims, and accompanying drawing forming a part of this specification and wherein:

Figure 1:
Figure 1 is a section of an illustrative embodiment of a metallized material constituting one phase of the instant invention.
Figure 2:
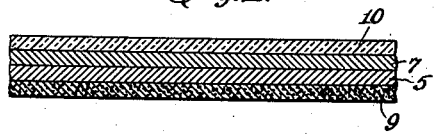
Figure 2 is a section of another illustrative embodiment of a metallized material constituting one phase of the instant invention.
Figure 3:
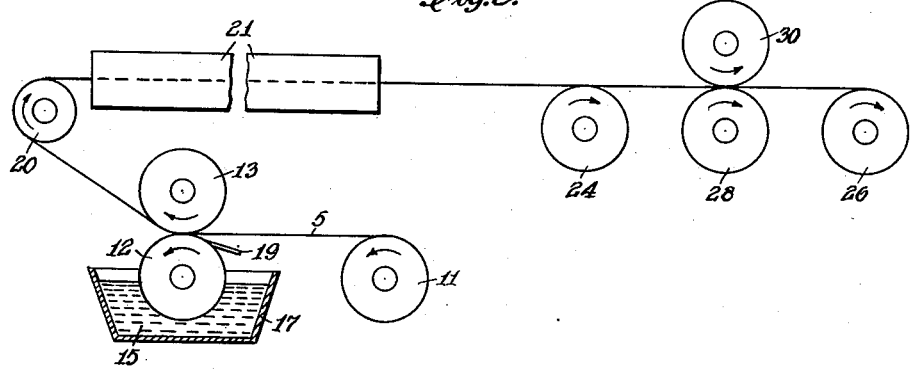
Figure 3 is a diagrammatic front elevation, partly in section, of an illustrative apparatus for carrying out the method.

In accordance with the principles of the instant invention, a composition comprising a binding agent, finely divided particles and a lubricant, and preferably also a plasticizer, in a suitable liquid vehicle which is preferably volatile at an elevated temperature, is applied to the selected base. The coated base is subjected to a drying operation, whereby the liquid vehicle is removed. At this stage of the process, there is produced a product consisting of the base having a coating comprising the non-volatile ingredients (including the plasticizer) of the composition. The coating of the product at this stage of the process is characterized by a dull mat appearance. In order to render the coating lustrous and provide it with a highly brilliant sheen, the coating is subjected to a burnishing operation. The burnishing operation may be performed in an operation continuous with the coating operation, thereby providing a continuous process. Alternatively, the burnishing operation may be performed as a separate and distinct operation, thereby providing an intermittent process.

The base material which may be utilized in accordance with this invention may be non-fibrous sheets or films of regenerated cellulose; cellulose ethers, such as ethyl, benzyl or glycol cellulose; cellulose esters, such as cellulose nitrate, cellulose acetate, cellulose formate; lowly etherified or esterified materials, such as a lowly etherified ethyl cellulose, lowly etherified benzyl cellulose, lowly etherified glycol cellulose, lowly esterified celuose nitrate, lowly esterified cellulose acetate; gelatin; casein; rubber derivatives, such as rubber hydrochloride, chlorinated rubber, the material prepared by reacting rubber and a metal halide, such as boron trifluoride, stannous or stannic chloride, stannic acid (see Thies and Clifford, Journal of Industrial and Engineering Chemistry, vol 26, page 123); resins, such as vinyl resin, polyvinyl acetals; or fibrous materials, such as cloth, fabric, paper, parchment paper, bristol board, box-board, etc. The paper, bristol board, box-board, etc. may be of the coated or non-coated varieties. In the preferred embodiment, the base which is to be metallized consists of a gummed stock, i. e., any one of the aforementioned materials, and particularly paper, which has been previously coated or gummed on the side opposite to that which is to be metallized with an adhesive composition which is normally dry and is energized upon being wetted with water. In another embodiment, the metallized coating may be applied directly on the gummed (water-sensitive) surface as, for example, in decalcomania stock. When the base is of the type which is not resistant to water (i. e., non-waterproof), the non-coated (non-metallized) surface and/or the metallized surface thereof may be coated with a wax coating, a water-sensitive (gummed) coating, a waterproof lacquer or a moistureproof lacquer as desired.

The metallizing composition, as previously mentioned, contains as essential solid ingredients a binding agent, solid particles (preferably powdered metal), and a lubricant. Preferably, the metallizing composition also contains a plasticizer in order to impart the desired degrees of flexibility and resilience to the metallized coating. Herein, the plasticizer, since when used it remains in the final product, will be considered a solid ingredient. Likewise, if desired, the metallizing composition may contain various modifying agents, such as coloring ingredients, for example, pigments, dyes or inks, to impart to the metallized coating the desired hue and color.

The binding agent serves to anchor and secure the coating to the base and make the coating resistant against water, moisture and such solvents which do not dissolve it. Ethyl cellulose is the preferred binding agent. It is, however, to be understood that the invention is not restricted thereto, since other film-forming substances such as cellulose derivatives (ethers and esters), such as nitrocellulose, cellulose acetate, or resins (or gums) of both the synthetic and natural varieties may be utilized.

The lubricant serves to impart that characteristic to the product which permits it to be burnished or renders it more amenable to the burnishing operation and thereby produce the desired high sheen and luster without deleterious results. It also serves to improve the waterproof and indeed the moistureproof characteristics of the final product. It, furthermore, renders the product more amenable to subsequent operations to which the product may be subjected. Paraffin wax having a melting point of from 40° C. to 59° C. is the preferred lubricating or frictioning agent. It is to be understood that the invention is not restricted to paraffin, since numerous other waxes or wax-like materials, such as carnauba, ceresin, beeswax, Japan wax, spermaceti, may be used. The term "wax" used in the claims is intended to cover generically the aforementioned substances.

The plasticizer serves to impart flexibility to the coating. The particular plasticizer, of course, depends on the nature of the film-forming substance. Dibutyl phthalate has given satisfactory results, though it will be apparent to one skilled in the art that other plasticizers may be employed.

The metal powder (finely divided) particles serve to impart the metallic appearance to the product. The metal which constitutes the powder is one which will, upon burnishing, in the environment herein described, produce a highly lustrous and brilliant sheen. Metallic tin powder consisting of finely divided particles of 500-mesh is preferred and has given highly satisfactory results, though it will be apparent to one skilled in the art that other metal powders can be used. Likewise, the size of the metal particles may vary within wide limits as is desired. If desired, finely divided pigments, such as titanium oxide, may be used in place of the metal powder, in which case the coated surface will be, after burnishing, opaque white but highly lustrous. The nature of the desired appearance of the coating will determine the nature of the solid particles.

If desired, the binding agent may be dissolved in a solvent and the wax dissolved in a solvent, and the two mixed together.

The liquid vehicle of the metallizing composition may consist of a single solvent or a solvent mixture in which the binding agent and the wax will be soluble or dispersed. Herein the expression "soluble" is not restricted to the usual meaning thereof but is, in addition, intended to include "dispersable." The precise solvent and quantity thereof depends on the precise ingredients of the metallizing composition, the mode of applying the metallizing composition and the method of drying the material after the metallizing coating composition has been applied. A solvent mixture comprising toluol, ethyl alcohol and butyl alcohol has given satisfactory results when the binding agent was ethyl cellulose, paraffin the lubricating agent, and 500-mesh powdered tin the metal powder.

The proportions of the solid ingredients constituting the final lustrous coating (burnished) may vary within wide limits depending on the non-volatile ingredients and the ultimate use of the final product. The approximate limits of the solid (non-volatile) ingredients may be given broadly as follows:

|  | Per cent |
| --- | --- |
| Binding agent | 4 – 7 |
| Solid particles | 90 –96 |
| Lubricant | 0.1–10 |
| Plasticizer | 0.0– 3 |

Hereafter are set forth two illustrative examples of two formulations of solid ingredients which have given satisfactory results:

|  | I | II |
| --- | --- | --- |
|  | Per cent | Per cent |
| Binding agent | 4.6 | 5.3 |
| Metal powder | 95.1 | 92.9 |
| Lubricant | 0.3 | 0.9 |
| Plasticizer | 0.0 | 0.9 |

In each of the formulae above set forth, the percentage (%) is by weight.

Hereafter are set forth two preferred formulations which have given satisfactory results:

|  | I | II |
| --- | --- | --- |
|  | Pounds | Pounds |
| Ethyl cellulose in ethyl alcohol (20% solids) viscous | 10½ | 2 |
| Ethyl cellulose in ethyl alcohol (7½% solids) flowing | 10 | 17¼ |
| Paraffin in toluol (10% solids) | 5 | 1¼ |
| Dibutyl phthalate solution | ½ |  |
| Ethyl alcohol | 4 | 5 |
| Butyl alcohol | 1½ | 1½ |
| 500-mesh metallic tin powder | 50 | 35 |

In use, these compositions are applied onto the selected base, preferably gummed stock, to produce final coatings which range in weight from approximately 3 lbs. to approximately 8 lbs. per ream, basis 20 x 26 five hundred count.

The thickness of the coating may vary within relatively wide limitations. Satisfactory results have been secured when the thickness of the coating in the final product was from approximately .0001" to .025", and preferably .003" thick.

The coating composition may be applied to the base by any convenient and appropriate procedure. For example, the coating composition may be coated onto the selected base by a gravure process, reverse roll coating, brush coating, knife coating, spraying, etc. The instant invention is particularly useful in making a product having multicolored effects, designs, indicia, etc. In this embodiment, the entire surface of the selected base is coated with a composition containing titanium oxide, as previously mentioned, to produce a white coating. Thereafter, and preferably in a continuous operation, a metallizing composition of the type previously mentioned is applied to predetermined areas of the aforementioned coated surface to produce designs, indicia, etc. The product is finally burnished. In this embodiment, the highly lustrous metallic coating in the form of designs, indicia, etc., appears on a highly lustrous white background. The various coatings may be reversed. Further, if desired, the coatings may be variously colored by the inclusion of a coloring agent in the respective compositions. Likewise, the same coating compositions, but differently colored, may be used.

In the embodiment previously described, if desired the entire surface of the base need not be coated with the composition which forms the background. The composition which is to form the background may be coated on the areas of the base which are to constitute the background and the composition which is to form the designs, indicia, etc., applied to those areas which have not been coated with the composition constituting the background.

In each of the two modifications immediately preceding, the multicolored surface may be further coated as previously herein described.

The burnishing operation may be performed in an operation continuous with the coating operation or in a separate and distinct operation. In performing the burnishing operation, the coated base material, after drying, is passed between two rollers of appropriate composition, for example, one being of steel and the other of composition, rotating in the same direction and in the direction of the feed of the material therethrough, the upper roller which is in contact with the coated surface having a peripheral speed approximately 3 times faster than the peripheral speed of the lower roller. Suitable pressure is applied to the rollers in accordance with the material subjected thereto and the result desired.

In order to more fully explain the instant invention, reference will now be had to the accompanying drawings wherein like reference numerals designate like parts and wherein the reference numeral 5 designates the selected base material, preferably in the form of a continuous length. In the embodiment shown in Figure 1, the base 5 is formed of a smooth-surfaced paper and carries a coating 7 thereon, said coating consisting essentially of the binding agent, lubricant, powdered metal and plasticizer. The coating 7, as previously mentioned, has been subjected to a burnishing operation, with the result that it is characterized by a highly lustrous and brilliant sheen.

In one embodiment of the invention, the paper 5 is provided on the surface opposite to that which carries the coating 7 with a coating of a water-sensitive gum coating 9. Instead of the water-sensitive coating 9, there may be applied a moisture-resistant coating, a waterproof coating, a wax coating, printing, decorations, etc. If desired, the metallic coating 7 may be coated with a transparent coating 10, which may consist of a water-sensitive (gummed), waterproof or moistureproof transparent coating of the type known in the art.

In carrying out the process, a web of the paper 5 having a dried water-sensitive adhesive coating 9 is unwound from a roll 11 and passes between a coating roller 12 and a pressure roller 13. The coating roller 12 is of the known engraved pad type, and it rotates in the coating composition 15 carried in the tank 17 in the same direction as the direction of travel of the web to be coated. A doctor 19, preferably of the oscillating type, controls the amount of coating solution to be applied by the coating roller 12 to the uncoated side of the paper 5. The pressure roller 13 is maintained under pressure by known means (not shown) sufficient to bring the base 5 in intimate contact with the roller 12 so that the coating composition 15 will be transferred to the base 5. After leaving the coating mechanism, the coated web passes over a guide roll 20, and thence into a drier 21 where the liquid vehicle is substantially eliminated and the coating dried.

No particular type of drier is required. A heated roll of appropriate dimension or a drier of the force-draft heated type have given satisfactory results. The drier is of such length and maintained at such a temperature that, when the web passes therefrom, the coating will be dry.

Upon leaving the drier 21, the coating has a dull mat appearance. In order to convert this dull mat coating to a highly lustrous coating, it is subjected to the burnishing operation which will now be described.

After leaving the drier 21, the now dried web passes over the roll 24 and is wound up on the roll 26. During the passage of the material from the roll 24 to the roll 26, the material is passed between a pair of rollers consisting of a lower steel roller 28 and an upper composition roller 30. The upper roller 30 has a peripheral speed 3 times that of the lower roller 28. In addition, the upper roller 30 is subjected to pressure, though, if desired, the lower roller also may be subjected to pressure.

The web is fed through the apparatus by feed wheels (not shown), and the rollers are all synchronized so that the speed thereof is as desired.

Figure 4:
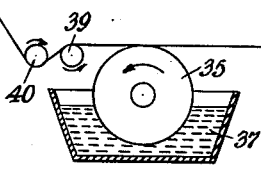
Figure 4 is another embodiment of an apparatus, partly in section, for applying the metallizing composition.

Referring now to Figure 4, which illustrates another embodiment of a coating mechanism, the reference numeral 35 designates a metallic unengraved roller which is partly submerged and rotates in the coating composition 37. The gummed paper passes over the roller 35, whereby the coating composition is applied to the ungummed surface of the paper which is fed in contact with the coating roller 35. Before the coating composition has set and while it is in liquid form, the web is passed over a rotating equalizer bar 39. The equalizer bar 39 is wound with wires, the number of windings and spacing thereof being in accordance with the amount of coating to remain on the coated web. When the equalizer bar 39 rotates either in the same or opposite to the direction of feed of the coated material, the excess coating material is removed and is conducted back to the composition 37. After leaving the equalizer bar 39, the coated material passes around a bar 40, which preferably is also rotated, and thence into the drier where the solvents are eliminated, and thereafter the coated material is subjected to the frictioning operation as previously mentioned.

As is apparent from the foregoing, the instant invention provides a gummed stock having a highly lustrous and preferably metallic-appearing coating, which has long been sought in the art. The lustrous coating is waterproof and may be embossed and/or printed, whereby its beauty and appearance may be further enhanced.

The product may be cut in various forms and shapes, and upon moistening with water may be affixed to various articles.

Since it is obvious that various changes and modifications may be made in the above description without departing from the nature or spirit thereof, this invention is not restricted thereto except as set forth in the appended claims.

I claim:

1. A composition of matter for producing a mat coating which upon burnishing will become highly lustrous, and consisting essentially of a volatile liquid vehicle in an amount to produce the desired viscosity and the following non-volatile ingredients in approximately the proportions set forth:

|  | Per cent |
|---|---|
| Film-forming binding agent | 4 – 7 |
| Pigment | 90 – 96 |
| Wax | 0.1 – 10 |
| Plasticizer | 0.0 – 3 |

2. A composition of matter for producing a mat coating which upon burnishing will become highly lustrous, and consisting essentially of a volatile liquid vehicle in an amount to produce the desired viscosity and the following non-volatile ingredients in approximately the proportions set forth:

| | Per cent |
|---|---|
| Film-forming binding agent | 4.6 |
| Metal powder | 95.1 |
| Wax | 0.3 |

3. A composition of matter for producing a mat coating which upon burnishing will become highly lustrous, and consisting essentially of a volatile liquid vehicle in an amount to produce the desired viscosity and the following non-volatile ingredients in approximately the proportions set forth:

| | Per cent |
|---|---|
| Film-forming binding agent | 5.3 |
| Metal powder | 92.9 |
| Wax | 0.9 |
| Plasticizer | 0.9 |

4. A composition of matter for producing a mat coating which upon burnishing will become highly lustrous, comprising the following ingredients in approximately the following proportions by weight:

| | Pounds |
|---|---|
| Ethyl cellulose in ethyl alcohol (20% solids) viscous | 10½ |
| Ethyl cellulose in ethyl alcohol (7½% solids) flowing | 10 |
| Paraffin in toluol (10% solids) | 5 |
| Dibutyl phthalate solution | ½ |
| Ethyl alcohol | 4 |
| Butyl alcohol | 1½ |
| 500-mesh metallic tin powder | 50 |

5. A composition of matter for producing a mat coating which upon burnishing will become highly lustrous, comprising the following ingredients in approximately the following proportions by weight:

| | Pounds |
|---|---|
| Ethyl cellulose in ethyl alcohol (20% solids) viscous | 2 |
| Ethyl cellulose in ethyl alcohol (7½% solids) flowing | 17¼ |
| Paraffin in toluol (10% solids) | 1¼ |
| Ethyl alcohol | 5 |
| Butyl alcohol | 1½ |
| 500-mesh metallic tin powder | 35 |

6. An article of manufacture comprising a base web or sheet having a water-energizable gum coating on one side thereof and a burnished coating on the opposite side thereof comprising the following ingredients in approximately the following proportions:

| | Per cent |
|---|---|
| Cellulose derivative | 4 – 7 |
| Pigment | 90 –96 |
| Wax | 0.1–10 |
| Plasticizer | 0.0– 3 |

7. An article of manufacture comprising a base web or sheet having a water-energizable gum coating on one side thereof and a burnished coating on the opposite side thereof comprising the following ingredients in approximately the following proportions:

| | Per cent |
|---|---|
| Film-forming binding agent | 4 – 7 |
| Pigment | 90 –96 |
| Wax | 0.1–10 |
| Plasticizer | 0.0– 3 |

8. An article of manufacture comprising a paper web or sheet having a water-energizable gum coating on one side thereof and a burnished coating on the opposite side thereof comprising the following ingredients in approximately the following proportions:

| | Per cent |
|---|---|
| Cellulose derivative | 4 – 7 |
| Pigment | 90 –96 |
| Wax | 0.1–10 |
| Plasticizer | 0.0– 3 |

9. An article of manufacture comprising a paper web or sheet having a water-energizable gum coating on one side thereof and a burnished coating on the opposite side thereof comprising the following ingredients in approximately the following proportions:

| | Per cent |
|---|---|
| Film-forming binding agent | 4 – 7 |
| Pigment | 90 –96 |
| Wax | 0.1–10 |
| Plasticizer | 0.0– 3 |

EDWIN G. STRAUS.